April 9, 1968

D. B. HARNEY 3,377,073

SHAFT SEAL

Filed April 26, 1965

INVENTOR.
DORAN B. HARNEY
BY Fulwider, Patton, Rieber,
Lee, and Utecht

ATTORNEYS

April 9, 1968   D. B. HARNEY   3,377,073
SHAFT SEAL
Filed April 26, 1965   2 Sheets-Sheet 2
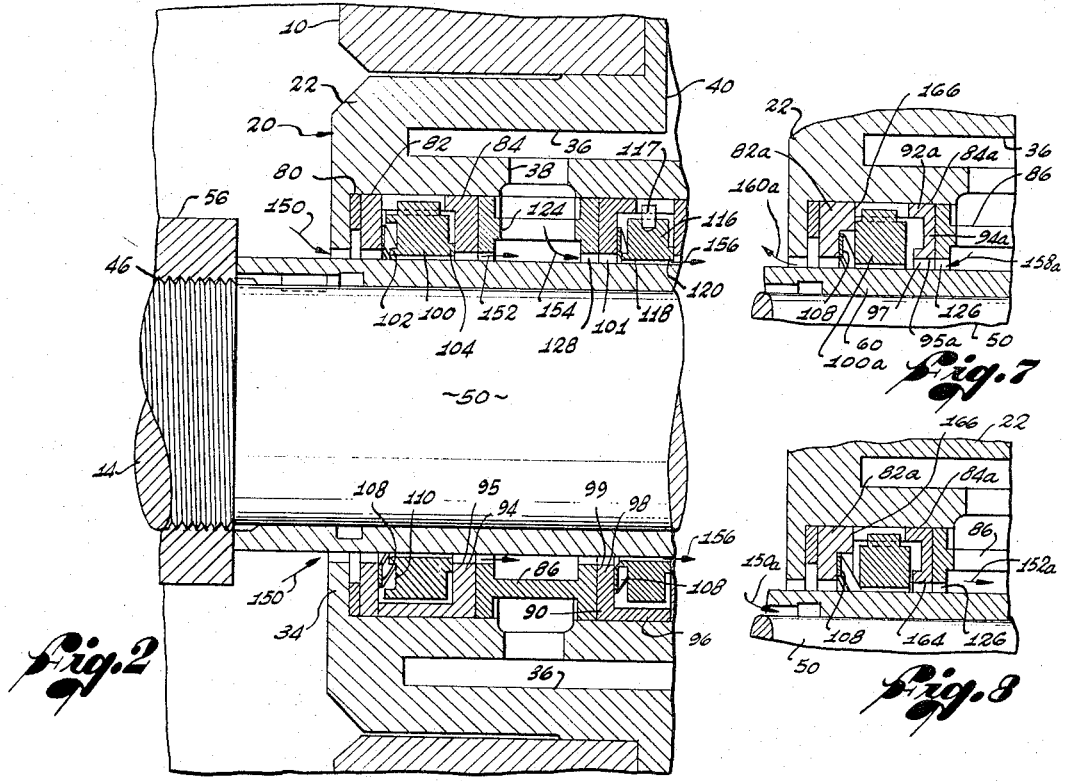
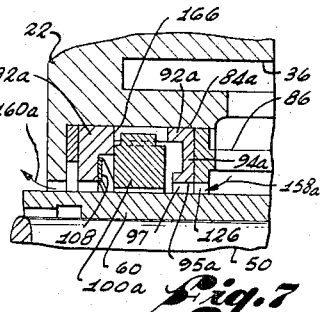
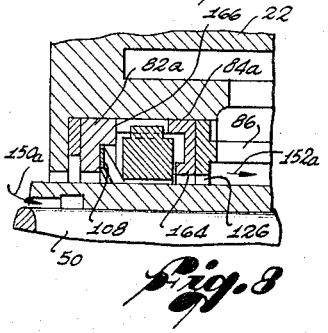
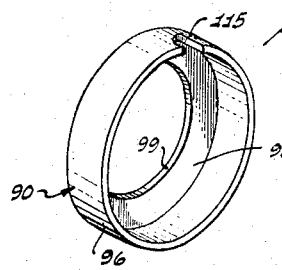
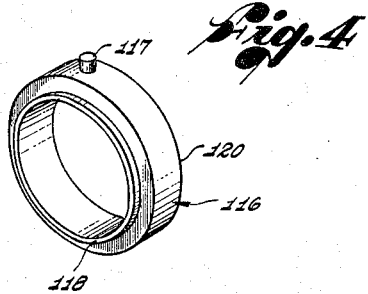
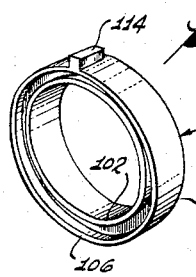
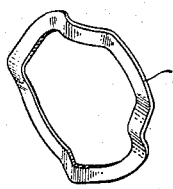
INVENTOR.
DORAN B. HARNEY
BY Fulwider, Patton, Rieber
Lee, and Utecht
ATTORNEYS United States Patent Office 3,377,073
Patented Apr. 9, 1968

3,377,073
SHAFT SEAL
Doran B. Harney, Downey, Calif., assignor to Dresser Industries, Inc., Dallas, Tex., a corporation of Delaware
Filed Apr. 26, 1965, Ser. No. 450,937
9 Claims. (Cl. 277—27)

ABSTRACT OF THE DISCLOSURE

The structure for sealing the cylindrical surface of a rotating shaft includes a body surrounding the shaft defining an annular ring groove having axially inwardly facing and axially outwardly facing groove walls defining radial surfaces. An annular seal ring is nonrotatably disposed in the groove for a limited axial and radial movement relative to the groove. The inner diameter of the seal ring makes a close but freely rotatable fit on the shaft, the clearance being only sufficient to provide a fluid bearing between the shaft and the seal. In one embodiment, a first annular sealing lip is provided at the radially outer portion of the inward wall of the seal ring, extending axially inward for making sealing engagement with the outward facing wall of the groove; and a second annular lip is provided on the outward facing wall of the sealing ring extending axially outward for making sealing engagement with the axially inward facing wall of the groove. When the seal ring is urged to the inner position where the first lip seals against the outward facing wall of the groove, a substantial portion of the inner surface of the seal ring is sealed from the pressure acting on the outer surface of the seal ring. When the seal ring is moved to the outer position wherein the second annular lip is in sealing engagement with the inwardly facing wall of the groove, a relatively small portion of the outer surface of the seal ring is sealed from the pressure acting on the inner surface of the seal ring.

In an alternative embodiment, the first and second seal lips may be provided on the groove walls rather than on the seal ring, to perform the same sealing functions.

Resilient means may be provided to urge the seal ring toward the outer position wherein the second annular sealing lip engages the inward facing groove wall.

The seal control leakage in either direction, being designed so that higher pressure fluid may exist on either side of the seal ring. One or the other of the sealing lips will always be effective to prevent fluid flow around the outer periphery of the seal ring; and the leakage between the ring and shaft will always be controlled by the differential fluid pressure acting across the ring.

---

This invention relates generally to fluid seals for rotating shafts and more particularly to improved shaft sealing devices for high speed, high pressure centrifugal pumps.

This invention finds its principal application in replacement of the more conventional shaft packing devices and labyrinth type bushing seals employed in pumps for handling high pressure, high temperature liquids such as, for example, in feed pumps for high pressure steam boilers, chemical and oil refinery processing systems and the like.

In the multiple floating ring pressure break down types of shaft seals heretofore known, which employ injection fluid to control leakage, the seal ring assemblies are arranged to provide for control of the rate of leakage of injection liquid to the pump or the like pressure containing device, but in many such cases the injection fluid is not compatible with the liquid being pumped, or is of such temperature difference as to adversely affect processes or efficiency of the system. Under such conditions controlled leakage inwardly through the seal device into the pump is undesirable and consequently it has heretofore been necessary to employ seals adapted to operate under conditions permitting controlled leakage outwardly from the pump. However, operations under conditions such as to permit controlled leakage outwardly from the pump are not always permissible because the kind of fluids being handled cannot be permitted to escape. It is desirable, therefore, that the shaft seal be of such construction as to be capable of operation under any necessary condition, whether it be such as to permit controlled leakage either inwardly or outwardly of the pump seal or under conditions of zero leakage.

The multiple floating ring pressure breakdown type of shaft seals heretofore employed have not been entirely suited to such a wide range of leakage conditions or to the proper control thereof.

Also, heretofore, the multiple floating ring pressure breakdown types of shaft seals have been constructed in such manner as to be subject to excessive wear and lacked sufficient durability and reliability.

It is an object, therefore, of this invention to furnish an improved shaft sealing device.

It is another object of this invention to furnish an improved sealing device of the multiple floating seal ring or pressure breakdown type.

It is still another object of this invention to furnish an improved hydraulic seal of the multiple floating seal ring, fluid injection type which is capable of being operated over a wide range of controlled conditions, including conditions under which controlled leakage in either direction past the seal is permitted or zero leakage is maintained.

It is still another object of this invention to provide a hydraulic shaft seal including improved means by which leakage of fluid in either direction past the seal can be more easily determined or eliminated as desired.

It is a further object of this invention to furnish a multiple floating ring, fluid injection type of hydraulic shaft seal of such construction as to provide improved control of the overall leakage thereof, and reduction in the quantity and pressure of the required injection fluid.

These and other objects, advantages and features of novelty will be evident hereinafter.

In the drawings which illustrate a presently preferred embodiment and mode of operation of the invention, and in which the same or similar reference characters designate the same or similar parts throughout the several views:

FIGURE 2 is a fragmentary, longitudinal sectional view of a portion of the same apparatus shown in FIGURE 1, illustrating the positional appearance of certain parts thereof when operating under an alternative set of conditions;

FIGURE 3 is an isometric, detailed, elevational view, in reduced size, showing the form of each of the several seal ring retainers shown in FIGURES 1 and 2;

FIGURE 4 is an isometric, detailed, elevational view of reduced size, showing the form of each of the several outboard, floating sealing rings shown in FIGURES 1 and 2;

FIGURE 5 is an isometric, detailed, elevational view of reduced size, of the inboard floating sealing ring shown in FIGURES 1 and 2;

FIGURE 6 is an isometric, detailed, elevational view of reduced size showing the form of each of the several seal ring thrust springs shown in FIGURES 1 and 2;

Figure 1:
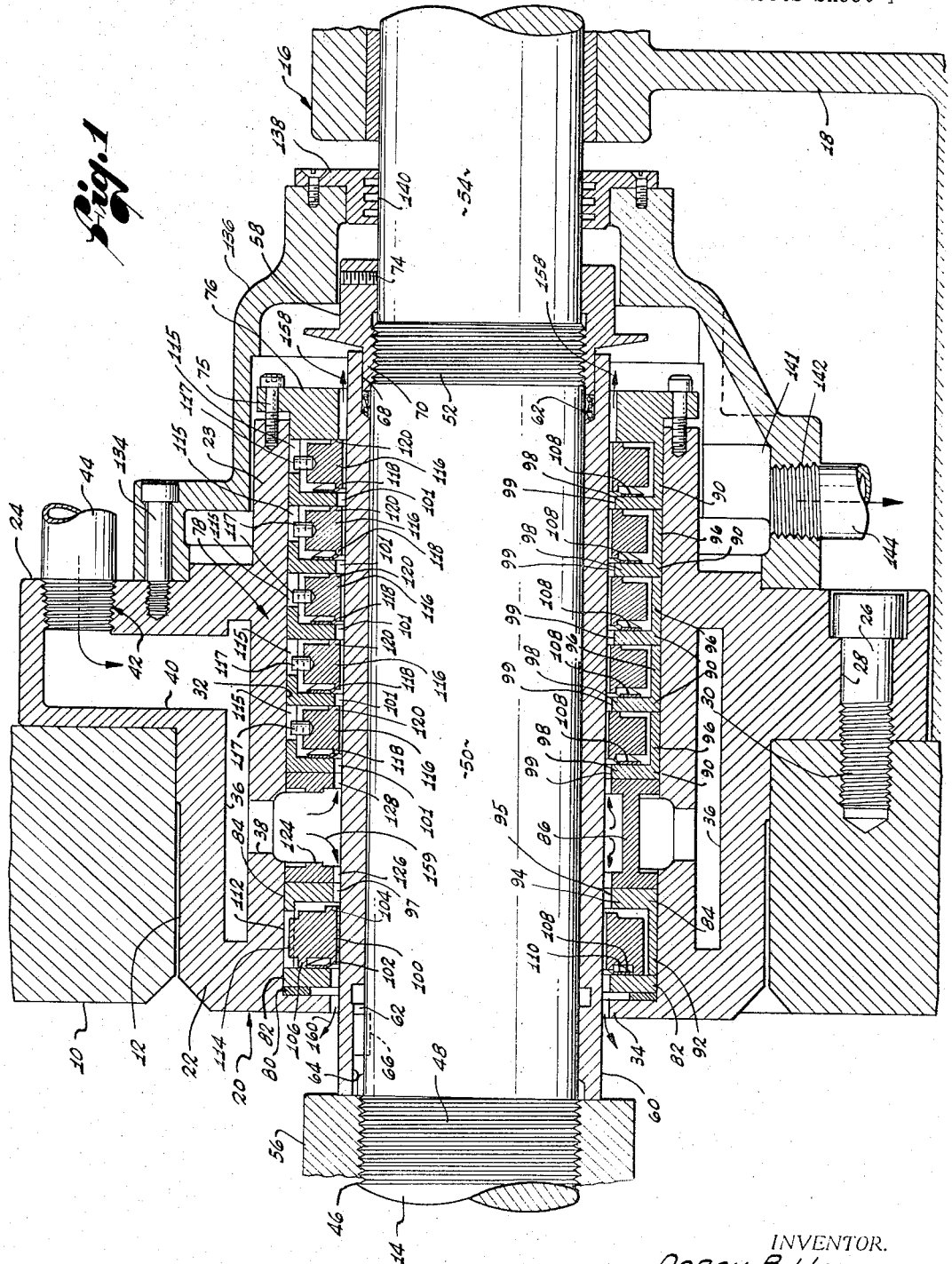
FIGURE 1 is a longitudinal sectional view of the general assembly of the pump shaft seal of the invention, as applied to the discharged end of a centrifugal pump and illustrating the positional appearance of certain parts thereof when operating under one given set of conditions, portions of the discharge end of such centrifugal pump being shown in fragmentary form.

FIGURE 7 is an enlarged, fragmentary, detail sectional view illustrating a modified form of the portion of the apparatus of FIGURE 1 enclosed within arrowed circle 7—7, and illustrating the positional appearance of certain parts thereof when operating under the same conditions illustrated in FIGURE 1; and FIGURE 8 is an enlarged, fragmentary, detail sectional view of the same portion of the apparatus shown in FIGURE 7 and illustrating its appearance when operating under the same alternative set of conditions as illustrated in FIGURE 2.

*Apparatus.*—Referring first primarily to FIGURE 1, the central portion of a centrifugal pump housing head is shown at 10, the head being formed with a coaxial bore 12 therethrough. Extending outwardly from the interior of the pump housing coaxially through the bore 12 in the pump housing head, is a pump shaft 14, which drivingly supports within the pump housing, a pump rotor, not shown. The pump shaft 14 is rotatably journaled adjacent its outboard ends in outboard bearings, one of which is partially shown at 16, and which are rigidly supported from the pump housing heads by means of suitable supporting brackets, one of which is partially shown at 18 in FIGURE 1.

Coaxially surrounding the pump shaft 14 and extending into and supported by the bore 12 of the pump housing head 10, is a seal ring assembly housing shown generally at 20. The seal ring assembly housing 20 is formed with a generally cylindrical body having an inboard cylindrical connection portion 22, an outboard cylindrical projecting portion 23, and an intermediate radial flange portion 24. The seal ring assembly housing is bolted to the pump housing head 10 with the inboard cylindrical portion 22 in coupling engagement within the bore 12 of the pump housing head 10, by means of a plurality of circumferentially spaced-apart, axially extending cap screws which extend through correspondingly positioned bolt holes in the radial flange portion 24 and into threaded engagement with the threaded sockets in the pump housing head 10, one such cap screw, bolt hole and threaded socket being shown respectively at 26, 28 and 30 in FIGURE 1. The seal ring assembly housing 20 is formed with a coaxial bore 32 of uniform inside diameter throughout the length thereof, except for a radially inwardly extending annular end retainer flange 34 of reduced inside diameter at the inboard end thereof.

The inboard cylindrical connector portion 22 of the seal ring assembly housing 20 is provided with an internal, coaxially positioned, circumferentially extending cavity 36, which communicates with the coaxial bore 32 through a radially extending annular passage 38. The annular cavity 36 is connected through a radial duct 40 within the flanged portion 24, to a threaded inlet port 42, to which may be connected a suitable inlet pipe 44, for injection of fluid under pressure to the seal ring assembly, as and for the purpose hereinafter more fully described.

The pump shaft 14 is provided with an inboard section 46 of maximum diameter having a threaded end interval 48, an intermediate section 50 of slightly reduced diameter, having a threaded end interval 52, and an outboard section 54 of still further slightly reduced diameter, which extends to and is supported by the hereinbefore mentioned outboard bearing 16. Coaxially retained upon the intermediate section 50 of the pump shaft 14, between a sleeve lock nut 56 threaded onto the threaded interval 48 and a sleeve packing compression nut 58 threaded onto the threaded interval 52, is a shaft seal sleeve 60. The shaft seal sleeve 60 is secured against rotation relative to the shaft section 50 which it surrounds, by means of a key 62, which extends into longitudinal key slots 64 and 66, formed in the shaft seal sleeve and pump shaft respectively. The outboard end of the shaft seal sleeve 60 is provided with a short, counter bore 68 into which an axially extending annular portion 70 of the compression nut 58 extends for compressing an annular packing body 62 therein into sealing engagement between the shaft seal sleeve 60 and the pump shaft. A set screw 74 extending radially through the body of the compression nut 58 into contact with the exterior surface of the pump shaft, serves to secure the compression nut 58 against loosening rotation on the threaded interval 52.

Contained coaxially within the annular space between the exterior of the shaft seal sleeve 60 and the coaxial bore 32, of the seal ring assembly housing 20, is a seal ring assembly shown generally at 78. The seal ring assembly 78 comprises a seal ring retainer assembly, the components of which are clamped in end-to-end fluid tight arrangement with each other in the bore 32 of the seal ring assembly housing 20 between the retainer flange 34 and an annular retainer gland 76, such components taken in successive order from the inboard end thereof abutting the said retainer flange 34, to the outboard end thereof abutting the retainer gland 76, being; seal gasket 80, seal washer 82, inboard seal ring retainer 84, annular spacer member 86 and a plurality of coaxial, outboard, seal ring retainers 90. The retainer gland 76 is bolted to the outer end of the cylindrical projecting portion 23 of the seal ring assembly housing by a plurality of circumferentially spaced-apart cap screws as shown at 75. The inboard seal ring retainer 84 is L-shaped in radial cross section, having an axial leg 92 and a radial leg 94. The radial leg 94 is formed with a central opening or bore 95 of greater diameter than that of the seal sleeve 60, thereby providing a substantial, annular clearance space 97 therebetween. Similarly, each of the outboard seal ring retainers 92 is L-shaped in radial cross section, having an axial leg 96 and a radial leg 98. Each of the radial legs 98 is formed with a central opening or bore 99 of substantially greater diameter than that of the seal sleeve 60, thereby providing annular clearance spaces 101 therebetween.

Contained within the inboard, annular ring groove formed between the seal washer 82 and the axial and radial legs 92 and 94 of the inboard seal ring retainer 84, is a generally annular inboard seal ring 100. As best shown in FIGURES 1 and 6, the inboard seal ring 100 is formed adjacent its bore with a pair of inner, axially oppositely extending, annular lips 102 and 104, and adjacent the inboard side of the perimeter thereof, with an outer, axially inwardly extending annular lip 106. The outer annular lip 106 extends slightly further axially from the body of the seal ring 100 than the adjacent inner annular lip 102. The diameter of the bore of the inboard seal ring 100 is such as to make a close but freely rotatable fit on the exterior cylindrical surface of the shaft seal sleeve 60, the diametrical clearance therebetween being, for example, in the order of from .008 to .010 inch. The outside diameter of the inboard seal ring 100 is such as to have a relatively large clearance with respect to the inside diameter of the axial leg 92 of the inboard seal ring retainer 84.

The overall axial width of the inboard seal ring 100 between the axially inwardly facing annular face of the annular lip 106 and the axially outwardly facing annular face of the annular lip 104 is such as to permit slight freedom for movement of the seal ring 100 axially between the adjacent annular surface of the seal washer 82 and the adjacent surface of the radial leg 94 of the seal ring retainer 84. Considerable freedom for both radial and axial floating movement of the inboard seal ring 100 within the seal ring groove and relative to the seal ring assembly housing 20 is thereby permitted, such freedom for radial movement being advantageous in permitting the seal rings to center themselves around the shaft in accommodation to any radial vibrational movements, bending or misalignment of the pump shaft which may occur for any reason, such as for example, by reason of unbalance of the rotating mass of the pump or by reason of unequalized pressures and temperatures within the pump structures.

The annular lip 106 of the inboard seal ring 100 is slightly longer axially than the adjacent annular lip 102, whereby when the inboard seal ring 100 is in its most axially inwardly displaced position within the ring groove as shown in FIGURE 1, the axially inner, annular end surface of the annular lip 106 is in sealing engagement with the adjacent annular surface of the seal washer 82, and when the seal ring 100 is in its most axially outwardly displaced position within the ring groove, as shown in FIGURE 2, the axially outer annular end surface of the annular lip 104 is in sealing engagement with the adjacent inner marginal surface of the radial leg 94 surrounding the central opening 95 of the seal ring retainer 84, thereby closing the annular clearance space 97 therebetween. A flat wave form or marcel type, annular spring 108 is retained within the annular recess 110 formed in the edge of the inboard sealing ring 100, between the lip 102 and the annular lip 106. The spring 108 is thereby secured against even coming into damaging frictional contact with the rotating shaft seal sleeve 60 and also serves to tend to retain the seal ring centered in the ring groove. The annular spring 108 serves to apply an axial force between the seal washer 82 and the seal ring 100, constantly urging the seal ring 100 towards its most axially outwardly displaced position within the ring groove, as shown in FIGURE 2.

The axial leg 92 of the inboard seal ring retainer 84, is provided with an axial slot as shown at 112, and the inboard seal ring 100 is provided at one point on the periphery thereof, with an integrally formed radially extending key 114, which engages the slot 112 to restrain the inboard seal ring 100 from rotation within the ring groove under the relatively high rotational torque which may be imposed upon it, by reason of the rotation of the relatively close fitting shaft seal sleeve 50 therein, in the presence of fluid. The circumferential and axial clearance between the slot 112 and the key 114 is such as not to interfere with the before described freedom of radial and axial floating movement of the inboard seal ring 100 in its ring groove.

As hereinbefore mentioned, each of the outboard seal ring retainers 90 is L-shaped in radial cross section, having an axial leg 96 and a radial leg 98. A plurality of coaxial, annular ring grooves are thereby formed, between the radially inwardly extending legs 98 of the seal ring retainers 90, and contained within each such annular ring groove is a generally annular outboard seal ring 116. As best shown in FIGURES 1 and 4, each of the outboard seal rings 116 is formed adjacent its bore with a pair of radially inner, axially oppositely extending coaxial, annular lips 118 and 120. The diameter of the bore of each of the outboard seal rings 116, like the inboard seal ring 100 is such as to make a close but freely rotatable fit on the exterior cylindrical surface of the shaft seal sleeve 60, the diametrical clearance therebetween, being, for example in the order of from .008 to .010 inch. The outside diameter of each of the outboard seal rings 116 is also such as to have a relatively large clearance with respect to the inside diameter of the axial leg 96 of the outboard seal ring retainer 90. The overall axial width of each of the outboard seal rings 116 between the axially opposite annular faces of the annular lips 118 and 120, is such as to permit slight freedom for axial movement of the outboard seal rings 116 between the adjacent inner faces of the radial legs 98, forming the ring groove.

As in the case of the inboard seal ring 100, considerable freedom for both radial and axial movement of the outboard seal rings 116 within the thus formed seal ring grooves and relative to the seal ring assembly housing 20 is thereby permitted.

The radial width of the axially outer one of the annular lips 120, is made slightly radially wider than that of the opposite, axially inner annular lip 118 for a reason which will be hereinafter more fully explained. When the outboard seal rings 116 are in their most axially outwardly displaced positions within their ring grooves, as shown in both FIGURES 1 and 2, the annular end surface of each of the annular lips 120 is in sealing engagement with the adjacent annular inner surface of one of the radial legs 98 surrounding the central opening 99 therein, thereby closing the annular clearance space 101 therebetween. A flat, wave form or marcel type, annular spring of the same kind illustrated at 108 in FIGURES 1 and 5, in connection with the inboard seal ring 100, is retained within each of the annular recesses formed at the axially inner edges of the outboard seal rings 116, between the annular lip 118, and the axial leg 96 of the seal ring retainer 90. The annular springs 108 serve to apply axial forces between the seal rings 116 and the adjacent surfaces of the radial legs 98, constantly urging the seal rings 116 toward their most axially outwardly displaced positions within the ring grooves, as shown in both FIGURES 1 and 2.

The axial leg 96 of each of the outboard seal ring retainers is provided with an axial slot as shown at 115, and each of the outboard seal rings 116 is provided on the periphery thereof with a pin 117 which engages the slot 115 to restrain the outboard seal rings from rotation within their ring groove.

Referring next principally to FIGURES 7 and 8 in which a modified form of the seal rings and seal ring retainers, which may be employed is shown, the inboard seal ring retainer shown generally at 84a, is generally L-shaped in radial cross-section, having an axial leg 92a and a radial leg 94a. The radial leg 94a is formed with a central opening or bore 95a of greater diameter than that of the seal sleeve 60, thereby providing a substantial annular clearance space 97 therebetween. The radial leg 94a is formed adjacent the central opening or bore 95a thereof, with an axially inwardly extending annular lip 164. A seal washer 82a is employed which is similar to the hereinbefore described seal washer 82, except that it is formed adjacent the periphery thereof with an axially outwardly extending, annular shoulder 166. The flat, wave-formed or marcel type, of annular spring 108 is retained within the annular recess formed in the outer surface of the seal washer 82a by the annular shoulder 166.

Contained within the inboard, annular ring groove formed between the seal washer 82a and the axial and radial legs 92a and 94a of the inboard seal ring retainer 84a, is a generally annular inboard seal ring 100a. The inboard seal ring 100a is similar to the hereinbefore described inboard seal ring 100, except that it is generally rectangular in radial cross sectional form and does not carry the annular lips 102, 104, and 106 as does seal ring 100, the annular lip 164 on the radial leg 97a and annular shoulder 166, on the seal washer 82a being substituted therefor and in operation performing substantially the same functions.

The hereinbefore mentioned annular spacer member 86 which is generally H-shaped in radial section, and which is clamped in an intermediate position between the radial leg 94 or 94a of the inboard seal ring retainer 84 or 84a as the case may be, and the radial leg 98 of the adjacent outboard seal ring retainer 90, is provided with a plurality of circumferentially spaced-apart, radially directed apertures, one of which is in view at 124 in FIGURES 1 and 2. The injection inlet port 42 is thus placed in communication, by way of the radial passage 40, circumferential cavity 36, annular passage 38 and apertures 124, with the intermediate space in the bore of the seal ring assembly housing surrounding the shaft seal sleeve 60 within the spacer member 86. From the intermediate space in the bore of the seal ring housing communication is completed to the confronting faces of the inboard seal ring 100 or 100a and the first of the outboard seal rings 116 by way of the opposite annular clearance spaces 126 and 128, between the inner diameters of the opposite legs of the annular spacer member 86 and the exterior of the shaft seal sleeve 60, and the annular clearance spaces 97 and 101, between the inner diameters of the radial legs 94 or 94a and 98 of the inboard seal ring retainer 84 or 84a and outboard seal ring retainer 90, respectively.

Coaxially covering the outward cylindrical, projecting portion 23, of the seal ring assembly housing is a bell-shaped leakage collection housing 136. The leakage collection housing 136 is bolted to the outer face of the radial flange portion 24 of the seal ring assembly housing 20, by means of a plurality of circumferentially spaced-apart cap screws, one of which is in view at 134. The leakage collection housing 136 is provided at the outboard end thereof with a leakage housing baffle 138 which has a bore with baffle grooves 140 therein, which make relatively close fit around the adjacent exterior surface of the outboard section 54 of the pump shaft 14. The lower side of the leakage collection housing 136 is formed with a leakage collection sump 141, having a threaded drain port 142 in the bottom thereof, to which may be connected a suitable drain pipe 144.

*Operation.*—In operation, referring first mainly to FIGURES 1 and 2 and assuming by way of example, and not by way of limitation, that the apparatus of this invention is being employed in connection with the discharge end of a centrifugal steam boiler feed pump, the inboard side of the centrifugal pump housing head 10 and the inboard end of the sealing ring assembly housing 20 and inboard seal ring 100 surrounding the inboard portion of the pump shaft 14, are subjected to the high pressure, high temperature water within the pump housing. In some installations the temperature of the water within the pump housing may range from 250° to 450° F. with corresponding pressures. Under such pressure conditions, in the absence of operational means to prevent it as hereinafter described, the inboard seal ring 100 will be forced by the water pressure to occupy the position shown in FIGURE 2, in which position the annular lip 104 thereof is in forceful sealing engagement with the radial leg 94 of the inboard seal ring retainer 84, thereby closing off the annular clearance space 97. The inboard sealing ring 100 is retained in the beforementioned position, as shown in FIGURE 2, by reason of both the force exerted thereon by the spring 108, and the outward differential fluid pressure acting across the ring 100, the effective, unbalanced area upon which the fluid thus acts being approximately equal to the annular end area of the annular lip 104. Under these latter conditions, such leakake as then occurs is in an outboard direction through the annular clearance between the seal ring 100 and the shaft seal sleeve 60 and through clearance spaces 97 and 126 as and in the direction illustrated by arrows 150 and 152 in FIGURE 2. The rate of such leakage past the inboard seal ring 100 will be substantially proportional to the differential pressure thereacross.

To control the rate of such leakage past the inboard seal ring 100 or even to eliminate such leakage entirely, water is injected under pressure by suitable pressure pump means, not shown, by way of inlet pipe 44, radial passage 40, annular cavity 36, annular passage 38, and through the radial apertures 124 in the annular spacer member 86, into the intermediate space in the seal ring assembly surrounding the shaft seal sleeve 60, between the outboard side of the inboard seal ring 100 and the inboard side of the outboard seal ring 116. By regulation of the pressure of the water thus injected, the differential pressure across the inboard seal ring 100 is controlled, whereby the leakage past the inboard seal ring 100 is controlled. For example, if the pressure of the injection liquid is approximately 10 to 15 p.s.i. lower than the pressure within the centrifugal pump housing, then the inboard seal ring 100 will occupy the position illustrated in FIGURE 2 as aforesaid, and the leakage outwardly past the inboard seal ring 100 as illustrated by arrows 150 and 152 will be at a relatively low rate resulting from the relatively low effective differential pressure. Under the latter conditions, leakage of the combined pump water and injection water will also occur in an outboard direction through the clearance spaces between the outboard seal rings 116 and the seal sleeve 60 as illustrated by arrows 154 and 156 in FIGURE 2 and arrow 158 in FIG-1. Under the latter conditions, the outboard seal rings 116 will be positioned with the annular lips 120 in sealing position over the ends of the annular clearance spaces 101 formed between the inner edges 99 of the radial legs 98 and the adjacent outer cylindrical surface of the shaft seal sleeve 60. Each outboard seal ring 116 is forced into such position by both the force of the annular springs 108 and the differential pressure of the liquid acting outwardly against the effective unbalanced area of the outboard seal rings 116, such effective unbalanced area being approximately equal to the area of the annular end surface of the annular lip 120.

By reason of the breakdown or stepwise division of the fluid pressure across each of the plurality of outboard seal rings 116, each seal ring is subjected to and resists a proportional amount of the total fluid pressure, and therefore the total combined leakage, of the pump liquid in an outboard direction past the outboard seal ring 100, and the combined leakage of pump fluid and injection fluid introduced through pipe 44, past the outboard seal rings 116, is of relatively low quantity. Such liquid as does leak outwardly past the outboard seal rings 116, as illustrated by the arrows 154, 156 and 158, is collected in the sump 140, and withdrawn therefrom through drainpipe 144.

By adjustment of the pressure of the liquid injected through pipe 44, as hereinbefore described, the differential pressure across the outboard seal ring 100 may be controlled such as to control the rate of leakage of pump fluid outwardly, past the inboard seal ring 100 to any desired rate within certain limits, to reduce such leakage to zero, or even to reverse the direction of such leakage inwardly into the pump housing past the outboard seal ring 100 in the direction indicated by arrows 159 and 160 in FIGURE 1. Under conditions of zero leakage and substantially zero differential pressure, by reason of the force exerted by the annular spring 108, the inboard seal ring 100 will remain in the sealing position illustrated in FIGURE 2. However, upon establishing a predetermined pressure differential condition such as to produce leakage inwardly toward the pump, as illustrated by the arrows 159 and 160, the inboard seal ring 100 will be forced in an inboard direction to the position illustrated in FIGURE 1, at which position the annular lip 106 of the seal ring 100 will be pressed into forceful sealing engagement with the axially outer surface of the seal washer 82. The effective, unbalanced area of the inboard seal ring 100 against which such inward differential pressure acts, tending to produce leakage inwardly to the pump, is equal approximately to the area of the annular surface of the seal ring 100 extending radially between the annular lip 106 and the outside cylindrical surface of the shaft seal sleeve 60. Thus the effective unbalanced area of the inboard seal ring 100 against which such differential pressures act, is substantially greater in an inboard direction than in an outboard direction, thereby enabling a relatively small differential pressure applied thereacross in an inboard direction to overcome the opposing force of spring 108 and move the seal ring 100 into the position shown in FIGURE 1 as aforesaid.

Under the latter injection pressure conditions in which leakage occurs inwardly into the pump, only slightly greater leakage of the injection liquid will occur in an outboard direction, past the outboard seal rings 116 because of the slightly increased injective pressure, and such leakage is collected in sump 140 and drained away through drain pipe 144, as hereinbefore described, for disposal or recycling reuse as desired.

Referring next to the operation of the alternative form of seal ring retainer and seal ring illustrated mainly in FIGURES 7 and 8, assuming again that the inboard end of the sealing ring assembly housing 20, surrounding the inboard portion of the pump shaft 14 is subjected to the high pressure, high temperature water within the pump housing head 10, in the absence of operational means to prevent it as hereinafter described, the inboard seal ring 100a will be forced to occupy the position shown in FIGURE 8, in which the axially outwardly facing surface of the seal ring 100a is in forceful sealing engagement with the annular sealing lip 164, of the inboard seal ring retainer 84a, thereby closing off the annular clearance space 97. As in the case of the inboard sealing ring 100, the inboard sealing ring 100a is retained in the latter position, as shown in FIGURE 8, by reason of both the force exerted thereon by the spring 108 and the outward differential pressure acting across the unbalanced area of the ring 100a, the effective area upon which the fluid thus acts being approximately equal to an annular area having an inside diameter equal to the diameter of the bore of the seal ring 100a and an outside diameter approximately equal to the outside diameter of the lip 164. Under such conditions, such leakage as then occurs will be in an outboard direction through the annular clearance between the seal ring 100a and the shaft seal sleeve 60, and thence through clearance spaces 97 and 126 as and in the direction illustrated by arrows 150a and 152a in FIGURE 8.

By adjustment of the pressure of the liquid injected through pipe 44, as hereinbefore described in connection with the seal ring 100, the differential pressure across the outboard seal ring 100a may be controlled such as to control the rate of leakage of pump fluid outwardly, pass the inboard seal ring 100a to any desired rate within certain limits, or to reduce such leakage to zero, or even to reverse the direction of such leakage inwardly into the pump housing, past the outboard seal ring 100a in the direction indicated by arrows 158a and 160a in FIGURE 7. Under conditions of zero leakage and substantially zero differential pressure across seal ring 100a, by reason of the force exerted by the annular spring 108 the inboard seal ring 100a will remain in the sealing position illustrated in FIGURE 8. However, upon establishing a predetermined pressure differential condition, such as to produce leakage inwardly toward the pump, as illustrated by the arrows 158a and 160a in FIGURE 7, the inboard seal ring 100a, will be forced in an inboard direction, in opposition to spring 108, to the position illustrated in FIGURE 7, at which position the axially inwardly facing surface of the seal ring 100a, adjacent the circumference thereof, will be pressed into forceful sealing engagement with the adjacent annular surface of the before mentioned annular shoulder 166 of the seal washer 182a. The effective unbalanced area of the outboard seal ring 100a, against which such inward differential pressure acts, tending to produce leakage inwardly to the pump, is equal approximately to the area of an annular surface extending between the bore of the seal ring 100a and approximately to the inside diameter of the annular shoulder 166. Thus, similarly to the action of the hereinbefore described inboard seal ring 100, the effective area of the outboard seal ring 100a against which differential pressures thus act, is substantially greater in an inboard direction than in an outboard direction, thereby permitting relatively small differential pressures thereacross in an inboard direction to overcome the force of spring 108 and move the seal ring 100a into the sealing position shown in FIGURE 7, as aforesaid.

While a preferred embodiment of the invention has been herein shown and described which is capable of fulfilling the objects and advantages sought, it is to be understood that the foregoing is illustrative only and is not to be limited thereby, but is to include all modifications and variations which may be made by those skilled in the art, without departing from the scope of the invention, as defined by the appended claims.

What is claimed is:

1. In means for effecting a fluid seal between a relatively rotatable cylindrical shaft and surrounding body, apparatus comprising:

an annular ring groove fixed to said body and coaxially surrounding said shaft, said ring groove being formed with an axially inwardly facing radially directed annular groove wall and an axially outwardly facing, radially directed annular groove wall, said groove walls confrontingly facing one another in fixed space relation;

an annular seal ring in said groove between said groove walls coaxially surrounding said shaft, said seal ring having a bore making a close but freely rotatable fit on said shaft; said seal ring being nonrotatably disposed in said groove for limited radial movement relative thereto;

a first coaxial, annular sealing lip extending axially between the radially outer portion of the axially inward face of said seal ring and said axially outwardly facing groove wall for making sealing engagement between said seal ring and said axially outwardly facing groove wall; said first sealing lip acting to seal a substantial portion of the axially inward face of said ring from the pressure of the fluid acting on its axially outward face;

and a second coaxial annular sealing lip extending axially between the radially inner portion of the axially outward face of said seal ring and said axially inwardly facing groove wall for making sealing engagement between said seal ring and said axially inwardly facing groove wall; said second sealing lip acting to seal a relatively small portion of the axially outward face of said ring from the fluid pressure acting on the axially inward face thereof;

the overall axial width of said ring being less than the axial width of said ring groove such as to permit limited axial movement of said seal ring in said groove between an axially inner position at which said first sealing lip makes sealing engagement between said seal ring and said axially outwardly facing groove wall, and an axially outer position at which said second sealing lip makes sealing engagement between said seal ring and said axially inwardly facing groove wall.

2. Apparatus according to claim 1; and resilient means acting between seal ring and said ring groove, urging said seal ring axially toward said axially outer position.

3. In means for effecting a fluid seal between a relatively rotatable cylindrical shaft and surrounding body, apparatus comprising:

an annular ring groove fixed to said body and coaxially surrounding said shaft, said ring groove being formed with an axially inwardly facing radially directed annular groove wall and an axially outwardly facing, radially directed annular groove wall, said groove walls confrontingly facing one another in fixed space relation;

an annular seal ring in said groove between said groove walls coaxially surrounding said shaft, said seal ring having a bore making a close but freely rotatable fit in said shaft; said seal ring being nonrotatably disposed in said groove for limited radial movement relative thereto;

a first coaxial, annular sealing lip extending axially outwardly from the radially outer portion of the axially outwardly facing surface of said groove walls, said lip having an axially, outwardly facing edge for making sealing engagement with said axially inward face of said seal ring; said first sealing lip acting to seal a substantial portion of the axially inward face of said ring from the pressure of the fluid acting on its axially outward face;

and a second coaxially, annular sealing lip extending axially inwardly from the radially inner portion of the axially inwardly facing surface of said groove wall, said lip having an axially inwardly facing edge for making sealing engagement with said axially outward face of said seal ring; said second sealing lip acting to seal a relatively small portion of the axially outward face of said ring from the fluid pressure acting on the axially inward face thereof;

the overall axial width of said ring between the said inward face and said outward face thereof being less than the axial width between the said edge of said first sealing lip and the said edge of said second sealing lip, such as to permit limited axial movement of said seal ring in said groove between an axially inner position at which said inward face of said seal ring makes sealing engagement with the said edge of said first sealing lip, and an axially outer position at which said outward face of said seal ring makes sealing engagement with the said edge of said second sealing lip.

4. Apparatus according to claim 3; and resilient means intermediate said axially inward face of said seal ring and said axially outwardly facing groove wall, urging said seal ring axially toward said axially outer position.

5. In means for effecting a fluid seal between a relatively rotatable cylindrical shaft and surrounding body, apparatus comprising:

an annular ring groove fixed to said body and coaxially surrounding said shaft, said ring groove being formed with an axially inwardly facing radially directed annular groove wall and an axially outwardly facing, radially directed annular groove wall, said groove walls confrontingly facing one another;

an annular seal ring in said groove between said groove walls coaxially surrounding said shaft, said seal ring having a bore making a close but freely rotatable fit in said shaft; said seal ring being nonrotatably disposed in said groove for limited radial movement relative thereto;

a first coaxial, annular sealing lip extending axially inwardly from the radially outer portion of the axially inward face of said seal ring and having an axially, inwardly facing end edge for making sealing engagement with said axially outwardly facing groove wall; said first sealing lip acting to seal a substantial portion of the axially inward face of said ring from the pressure of the fluid acting on its axially outward face;

and a second coaxial annular sealing lip extending axially outwardly from the radially inner portion of the axially outward face of said seal ring and having an axially outwardly facing end edge for making sealing engagement with said axially inwardly facing groove wall; said second sealing lip acting to seal a relatively small portion of the axially outward face of said ring from the fluid pressure acting on the axially inward face thereof;

the overall axial width of said ring between the said inwardly facing end edge and said outwardly facing end edge being less than the axial width of said ring groove between said groove walls, such as to permit limited axial movement of said seal ring in said groove between an axially inner position at which said inwardly facing end edge makes sealing engagement with said axially outwardly facing groove wall, and an axially outer position at which said outwardly facing end edge makes sealing engagement with said axially inwardly facing groove wall.

6. In means for effecting a fluid seal between a relatively rotatable cylindrical shaft and surrounding body, apparatus comprising:

an annular ring groove fixed to said body and coaxially surrounding said shaft, said ring groove being formed with an axially inwardly facing radially directed annular groove wall and an axially outwardly facing, radially directed annular groove wall, said groove walls confrontingly facing one another;

an annular seal ring in said groove between said groove walls coaxially surrounding said shaft, said seal ring being formed with, a coaxial, annual sealing lip extending axially inwardly from the radially outer portion of the axially inward face of said seal ring and having an axially, inwardly facing end edge for making sealing engagement with said axially outwardly facing groove wall;

and a coaxial annular sealing lip extending axially outwardly from the radially inner portion of the axially outward face of said seal ring and having an axially outwardly facing end edge for making sealing engagement with said axially inwardly facing groove wall, the overall axial width of said ring between the said inwardly facing end edge and said outwardly facing end edge being less than the axial width of said ring groove between said groove walls, such as to permit limited axial movement of said seal ring in said groove between an axially inner position at which said inwardly facing end edge makes sealing engagement with said axially outwardly facing groove wall, and an axially outer position at which said outwardly facing end edge makes sealing engagement with said axially inwardly facing groove wall;

and resilient means intermediate said axially inward face of said seal ring and said axially outwardly facing groove wall, urging said seal ring axially toward said last mentioned position.

7. In means for effecting a fluid seal between a relatively rotatable cylindrical shaft and surrounding body, apparatus comprising:

an annular ring groove fixed to said body and coaxially surrounding said shaft, said ring groove being formed with an axially inwardly facing radially directed annular groove wall and an axially outwardly facing, radially directed annular groove wall, said groove walls confrontingly facing one another;

an annular seal ring in said groove between said groove walls coaxially surrounding said shaft, said seal ring being formed with, a first coaxial, annular sealing lip extending axially inwardly from the radially outer portion of the axially inward face of said seal ring and having an axially, inwardly facing end edge for making sealing engagement with said axially outwardly facing groove wall;

a second coaxial, annular lip extending axially inwardly from the radially inner portion of the axially, inward face of said seal ring;

and a third coaxial annular sealing lip extending axially outwardly from the radially inner portion of the axially outward face of said seal ring and having an axially outwardly facing end edge for making sealing engagement with said axially inwardly facing groove wall;

the overall axial width of said ring between the said inwardly facing end edge of said first sealing lip and said outwardly facing end edge of said third sealing lip being less than the axial width of said ring groove between said groove walls, such as to permit limited axial movement of said seal ring in said groove between an axially inner position at which said inwardly facing end edge makes sealing engagement with said axially outwardly facing groove wall, and an axially outer position at which said outwardly facing end edge makes sealing engagement with said axially inwardly facing groove wall;

and resilient means positioned intermediate said axially inward face of said seal ring and said axially outwardly facing groove wall, and between said first sealing lip and said second lip, urging said seal ring axially toward said last mentioned position.

8. Apparatus according to claim 2;
wherein said resilient means is a flat wave form type annular spring.

9. Apparatus according to claim 8;
and a third coaxial annular lip extending axially between the radially inner portion of the axially inward face of said seal ring and said axially outward facing groove wall, for maintaining said annular spring out of engagement with said shaft.

References Cited

UNITED STATES PATENTS

| | | | |
|---|---|---|---|
| 2,221,225 | 11/1940 | Weis et al. | 277—3 X |
| 3,213,798 | 10/1965 | Carswell | 277—59 X |

FOREIGN PATENTS

| | | |
|---|---|---|
| 537,932 | 7/1941 | Great Britain. |
| 891,419 | 3/1962 | Great Britain. |

SAMUEL ROTHBERG, *Primary Examiner.*